US009344842B2

(12) United States Patent
Huston

(10) Patent No.: US 9,344,842 B2
(45) Date of Patent: May 17, 2016

(54) SYSTEM AND METHOD FOR VIEWING GOLF USING VIRTUAL REALITY

(76) Inventor: Charles D. Huston, Austin, TX (US)

( * ) Notice: Subject to any disclaimer, the term of this patent is extended or adjusted under 35 U.S.C. 154(b) by 623 days.

(21) Appl. No.: 13/182,914

(22) Filed: Jul. 14, 2011

(65) Prior Publication Data

US 2012/0007885 A1  Jan. 12, 2012

Related U.S. Application Data

(63) Continuation-in-part of application No. 13/182,930, filed on Jul. 14, 2011, and a continuation-in-part of application No. 12/111,688, filed on Apr. 29, 2008, which is a continuation-in-part of application No.

(Continued)

(51) Int. Cl.
| | |
|---|---|
| G09G 5/00 | (2006.01) |
| H04W 4/02 | (2009.01) |
| H04L 29/08 | (2006.01) |
| G01S 19/19 | (2010.01) |

(52) U.S. Cl.
CPC ............... *H04W 4/02* (2013.01); *H04L 67/18* (2013.01); *G01S 19/19* (2013.01)

(58) Field of Classification Search
CPC ............ A63B 69/0024; A63B 2220/836; A63B 24/0003; A63B 2024/0025; A63B 2220/806; A63B 2220/807; A63B 69/0053; A63B 2220/05; A63B 24/0062; A63B 69/3632; A63B 2225/50; A63B 59/0074; A63B 69/36; G01S 5/0009; G01S 19/19; G06K 9/00671

USPC ........... 455/404.2, 456.1–456.6; 345/33–636, 345/653, 659; 709/219; 705/14.66, 14.67
See application file for complete search history.

(56) References Cited

U.S. PATENT DOCUMENTS

| | | |
|---|---|---|
| 5,364,093 A | 11/1994 | Huston et al. |
| 5,802,492 A | 9/1998 | DeLorme et al. |
| 5,913,918 A | 6/1999 | Nakano et al. |

(Continued)

FOREIGN PATENT DOCUMENTS

| | | | |
|---|---|---|---|
| EP | 1077421 A2 * | 2/2001 | ............. G06F 17/60 |
| EP | 1262213 | 12/2002 | |

(Continued)

OTHER PUBLICATIONS

Final Office Action mailed Jul. 24, 2012 for U.S. Appl. No. 12/111,688.

(Continued)

*Primary Examiner* — Charles Appiah
*Assistant Examiner* — Edward Zhang
(74) *Attorney, Agent, or Firm* — Egan, Peterman, Enders & Huston LLP

(57) ABSTRACT

A system and method for viewing artificial reality (AR) messages on a golf course, where the messages are geo-referenced artificial reality words or symbols to indicate distances, tips, targets or other information to the golfer. Typically, the AR messages are geo-referenced to a fixed location on the golf hole, such as a hazard or green. Using the spectator's chosen location as the viewing origin, an artificial reality message or object is inserted into the golfer's perspective view of the golf hole. Outings and contests can be held even if the matches are separated by hours or days, and outcomes and information published to select groups or individuals.

27 Claims, 9 Drawing Sheets

Related U.S. Application Data

11/875,414, filed on Oct. 19, 2007, which is a continuation-in-part of application No. 11/624,998, filed on Jan. 19, 2007, which is a continuation-in-part of application No. 11/456,715, filed on Jul. 11, 2006, now Pat. No. 7,855,638, and a continuation-in-part of application No. 11/456,723, filed on Jul. 11, 2006, now Pat. No. 7,518,501.

(60) Provisional application No. 60/699,205, filed on Jul. 14, 2005.

(56) References Cited

U.S. PATENT DOCUMENTS

| | | | |
|---|---|---|---|
| 6,115,177 A | 9/2000 | Vossler | |
| 6,166,679 A | 12/2000 | Lemelson et al. | |
| 6,195,090 B1 | 2/2001 | Riggins, III | |
| 6,199,015 B1 | 3/2001 | Curtwright et al. | |
| 6,317,127 B1 | 11/2001 | Daily et al. | |
| 6,330,356 B1 | 12/2001 | Sundareswaran et al. | |
| 6,409,607 B1* | 6/2002 | Libit et al. | 473/170 |
| 6,411,266 B1 | 6/2002 | Maguire, Jr. | |
| 6,452,544 B1 | 9/2002 | Hakala et al. | |
| 6,559,884 B1 | 5/2003 | Tamir et al. | |
| 6,578,203 B1 | 6/2003 | Anderson, Jr. et al. | |
| 6,671,390 B1 | 12/2003 | Barbour et al. | |
| 6,721,542 B1 | 4/2004 | Anttila et al. | |
| 6,744,403 B2 | 6/2004 | Milnes et al. | |
| 6,801,516 B1 | 10/2004 | Lomp et al. | |
| 6,879,443 B2 | 4/2005 | Spitzer et al. | |
| 6,885,652 B1 | 4/2005 | Ozukturk et al. | |
| 6,894,994 B1 | 5/2005 | Grob et al. | |
| 6,909,738 B2 | 6/2005 | Akopian et al. | |
| 6,917,644 B2 | 7/2005 | Cahn et al. | |
| 6,920,328 B2 | 7/2005 | Wollrab | |
| 6,996,402 B2 | 2/2006 | Logan et al. | |
| 7,002,551 B2 | 2/2006 | Azuma et al. | |
| 7,031,728 B2 | 4/2006 | Beyer, Jr. | |
| 7,053,780 B1 | 5/2006 | Straub et al. | |
| 7,123,215 B2 | 10/2006 | Nakada | |
| 7,209,035 B2 | 4/2007 | Tabankin et al. | |
| 7,317,705 B2 | 1/2008 | Hanson | |
| 7,353,034 B2 | 4/2008 | Haney | |
| 7,441,198 B2 | 10/2008 | Dempski et al. | |
| 7,546,317 B1 | 6/2009 | Kaptelinin | |
| 7,593,687 B2 | 9/2009 | Anderson, Jr. et al. | |
| 7,716,283 B2 | 5/2010 | Thukral | |
| 7,812,766 B2 | 10/2010 | Leblanc et al. | |
| 8,172,702 B2* | 5/2012 | Meadows et al. | 473/407 |
| 2002/0038178 A1* | 3/2002 | Talkenberg et al. | 701/200 |
| 2002/0094853 A1 | 7/2002 | Hayashi | |
| 2002/0154174 A1 | 10/2002 | Redlich et al. | |
| 2002/0188678 A1 | 12/2002 | Edecker et al. | |
| 2003/0032436 A1 | 2/2003 | Mikuni | |
| 2003/0038892 A1 | 2/2003 | Wang et al. | |
| 2003/0109322 A1* | 6/2003 | Funk et al. | 473/222 |
| 2003/0149496 A1* | 8/2003 | Johnson | 700/91 |
| 2003/0156134 A1* | 8/2003 | Kim | 345/753 |
| 2003/0174178 A1 | 9/2003 | Hodges | |
| 2003/0187730 A1 | 10/2003 | Natarajan et al. | |
| 2003/0189589 A1 | 10/2003 | LeBlanc et al. | |
| 2003/0194685 A1* | 10/2003 | Adams | 434/236 |
| 2004/0036622 A1 | 2/2004 | Dukach et al. | |
| 2004/0051680 A1 | 3/2004 | Azuma et al. | |
| 2004/0104935 A1 | 6/2004 | Williamson et al. | |
| 2004/0147329 A1* | 7/2004 | Meadows et al. | 473/131 |
| 2004/0161246 A1* | 8/2004 | Matsushita et al. | 398/187 |
| 2005/0078195 A1 | 4/2005 | VanWagner | |
| 2005/0107952 A1 | 5/2005 | Hoshino et al. | |
| 2005/0143096 A1 | 6/2005 | Boesch | |
| 2005/0148388 A1 | 7/2005 | Vayra et al. | |
| 2005/0207617 A1* | 9/2005 | Sarnoff | 382/103 |
| 2005/0227791 A1* | 10/2005 | McCreary et al. | 473/407 |
| 2005/0250458 A1 | 11/2005 | Graham et al. | |
| 2005/0259002 A1 | 11/2005 | Erario et al. | |
| 2006/0015923 A1 | 1/2006 | Chuah et al. | |
| 2006/0075445 A1* | 4/2006 | O'Kane | 725/100 |
| 2006/0104600 A1 | 5/2006 | Abrams | |
| 2006/0105857 A1 | 5/2006 | Stark | |
| 2006/0136173 A1 | 6/2006 | Case et al. | |
| 2006/0195361 A1 | 8/2006 | Rosenberg | |
| 2006/0262140 A1 | 11/2006 | Kujawa et al. | |
| 2006/0284791 A1* | 12/2006 | Chen et al. | 345/8 |
| 2007/0024527 A1* | 2/2007 | Heikkinen et al. | 345/9 |
| 2007/0060408 A1* | 3/2007 | Schultz et al. | 473/131 |
| 2007/0103292 A1 | 5/2007 | Burkley et al. | |
| 2007/0150444 A1 | 6/2007 | Chesnais et al. | |
| 2007/0179792 A1 | 8/2007 | Kramer | |
| 2007/0191020 A1 | 8/2007 | Fischer et al. | |
| 2007/0255831 A1 | 11/2007 | Hayashi et al. | |
| 2007/0265089 A1 | 11/2007 | Robarts et al. | |
| 2007/0282688 A1* | 12/2007 | Buhrow et al. | 705/14 |
| 2008/0194323 A1 | 8/2008 | Merkli et al. | |
| 2008/0293443 A1 | 11/2008 | Pettinato | |
| 2009/0054084 A1 | 2/2009 | Buhrke et al. | |
| 2009/0089162 A1 | 4/2009 | Davis et al. | |
| 2009/0094106 A1* | 4/2009 | Porter et al. | 705/14 |
| 2009/0102859 A1 | 4/2009 | Athsani et al. | |
| 2009/0147070 A1 | 6/2009 | Marathe et al. | |
| 2009/0300520 A1 | 12/2009 | Ashutosh et al. | |
| 2011/0154223 A1 | 6/2011 | Whitnah et al. | |
| 2011/0157180 A1 | 6/2011 | Burger et al. | |
| 2011/0191141 A1 | 8/2011 | Thompson et al. | |
| 2011/0288914 A1 | 11/2011 | Guthrie | |
| 2011/0305369 A1* | 12/2011 | Bentley et al. | 382/103 |

FOREIGN PATENT DOCUMENTS

| | | | |
|---|---|---|---|
| EP | 1113669 | 7/2011 | |
| JP | 10-154242 | 6/1998 | |
| JP | 10154242 A * | 6/1998 | G06T 17/00 |
| KR | 10-2004-0047692 | 6/2004 | |
| KR | 10-2005-0055506 | 6/2005 | |
| WO | 01/05476 | 1/2001 | |
| WO | 01/36061 | 5/2001 | |

OTHER PUBLICATIONS

Office Action mailed Sep. 10, 2012 for U.S. Appl. No. 13/182,930.
Office Action mailed Aug. 29, 2012 for U.S. Appl. No. 13/188,030.
Office Action mailed Aug. 20, 2012 for U.S. Appl. No. 13/423,423.
O'Malley et al., "Human Activity Tracking for Wide-Area Surveillance," University of Florida, Department of Electrical and Computer Engineering, May 2002, 7 pages.
Barstow et al., "Personalized Interactive Real-Time Sports Reporting Using Java," American Programmer, Jan. 1997, pp. 32-37.
International Search Report, PCT/US2006/027218, mailed Feb. 12, 2007.
Office Action mailed Apr. 14, 2009 for U.S. Appl. No. 11/456,715.
Final Office Action mailed Dec. 28, 2009 for U.S. Appl. No. 11/456,715.
Office Action mailed Mar. 16, 2010 for U.S. Appl. No. 11/456,715.
Notice of Allowance mailed Oct. 4, 2010 for U.S. Appl. No. 11/456,715.
Office Action mailed Apr. 17, 2008 for U.S. Appl. No. 11/456,723.
Final Office Action mailed Oct. 1, 2008 for U.S. Appl. No. 11/456,723.
Notice of Allowance mailed Dec. 15, 2008 for U.S. Appl. No. 11/456,723.
Office Action mailed Oct. 6, 2009 for U.S. Appl. No. 11/624,998.
Office Action mailed Apr. 14, 2010 for U.S. Appl. No. 11/624,998.
Office Action mailed Sep. 1, 2010 for U.S. Appl. No. 11/624,998.
Office Action mailed Feb. 15, 2011 for U.S. Appl. No. 11/624,998.
Office Action mailed Jun. 14, 2011 for U.S. Appl. No. 11/624,998.
Office Action mailed Oct. 6, 2009 for U.S. Appl. No. 11/875,414.
Final Office Action mailed Jun. 22, 2010 for U.S. Appl. No. 11/875,414.
Office Action mailed Dec. 21, 2010 for U.S. Appl. No. 11/875,414.
Final Office Action mailed Jun. 9, 2011 for U.S. Appl. No. 11/875,414.

(56) References Cited

OTHER PUBLICATIONS

Office Action mailed Aug. 8, 2011 for U.S. Appl. No. 12/111,688.
Office Action mailed Mar. 4, 2011 for U.S. Appl. No. 12/146,907.
Final Office Action mailed Jun. 13, 2011 for U.S. Appl. No. 12/146,907.
Office Action mailed Nov. 22, 2012 for pending KR Application No. 10-2008-7003027.
Final Office Action mailed Nov. 7, 2011 for U.S. Appl. No. 11/624,998.
Office Action mailed Mar. 27, 2012 for U.S. Appl. No. 11/875,414.
Office Action mailed Jan. 4, 2012 for U.S. Appl. No. 12/146,907.
Notice of Allowance mailed Mar. 9, 2012 for U.S. Appl. No. 12/146,907.
Office Action mailed Jan. 3, 2012 for U.S. Appl. No. 13/188,030.
Notice of Allowance mailed May 18, 2014 for U.S. Appl. No. 13/423,423.
Final Office Action mailed Jun. 30, 2014 for U.S. Appl. No. 13/182,930.
Office Action mailed Dec. 16, 2014 for U.S. Appl. No. 12/111,688.
Office Action for U.S. Appl. No. 14/486,480 mailed Sep. 24, 2015.
Final Office Action mailed Feb. 6, 2013 for pending U.S. Appl. No. 13/423,423.
Office Action mailed Aug. 20, 2013 for U.S. Appl. No. 13/423,423.
Office Action mailed Feb. 12, 2013 for EP Application No. 06787161.6.
Final Office Action mailed Apr. 8, 2013 for U.S. Appl. No. 13/182,930.
Office Action mailed Aug. 2, 2013 for U.S. Appl. No. 12/111,688.
Notice of Allowance mailed Aug. 6, 2013 for U.S. Appl. No. 13/605,174.
Office Action mailed Sep. 25, 2013 for U.S. Appl. No. 13/182,930.
Office Action mailed Aug. 7, 2015 for U.S. Appl. No. 14/037,642.
Final Office Action mailed Sep. 9, 2015 for U.S. Appl. No. 12/111,688.

* cited by examiner

SYSTEM AND METHOD FOR VIEWING GOLF USING VIRTUAL REALITY

PRIORITY CLAIM

This application is a continuation-in-part of U.S. patent application Ser. No. 13/182,930 entitled "SYSTEM AND METHOD FOR CREATING AND SHARING AN EVENT USING A SOCIAL NETWORK" filed concurrently herewith. This application is further a continuation-in-part of U.S. patent application Ser. No. 12/111,688 filed Apr. 29, 2008 which is a continuation-in-part of U.S. patent application Ser. No. 11/875,414 filed Oct. 19, 2007 which is a continuation-in-part of U.S. patent application Ser. No. 11/624,998 filed Jan. 19, 2007 which is a continuation-in-part of U.S. patent application Ser. No. 11/456,715 (now U.S. Pat. No. 7,855,638) and Ser. No. 11/456,723 filed Jul. 11, 2006 both of which claim priority to U.S. Provisional Application No. 60/699,205 filed Jul. 14, 2005; all of which are incorporated herein by reference, and the benefit of 35 U.S.C. §120 is claimed.

BACKGROUND

1. Field of the Invention

This invention relates to a system and methods for enhancing the play of golf. In particular, the system and methods hereof uses artificial reality to provide visual information to a golfer.

2. Description of the Related Art

U.S. Pat. No. 7,855,638 and U.S. patent application Ser. Nos. 11/624,998; 11/875,414; 12/111,688; and 12/146,907 relate generally to viewing people, places, and events, such as sporting events, using positioning and artificial reality to improve the event viewing experience. While these applications address how artificial reality can be used in golf, the present application addresses the golf use case in detail and the many features and functions that are enabled where the "user" of artificial reality is the player participant. Use of GPS as an aid in the play of golf is known, see, e.g. U.S. Pat. Nos. 5,564,093; 5,438,518; and 7,118,498. (All patents and publications cited herein are incorporated by reference.) Such golf aids use a plan view of a hole or golf course or portions of a hole. Such golf aids tell distances to features, such as hazards or green or cup using a GPS position referenced to a point-of-interest ("POI") database. While a plan view is particularly useful for shot planning, such views can be confusing during use on the golf course and typically have limited functions in order to comply with USGA rules for use in handicap computation.

Commercial applications of dedicated golf handheld devices are available from SkyHawke, Callaway or Garmin. Further, many companies, such as Golflogix and Golfscape, have golf assistance software applications for smart phones and tablet computers that have a built-in GPS. Commercial applications of augmented reality exist such as Layar, Wikitude, Junaio, Sekai Camera and others which use augmented reality to aid finding information about points of interest. See, e.g., www.layar.com, www.wikitude.org/en/, and www.junaio.com.

SUMMARY OF THE INVENTION

Generally speaking, the device and methods of the present invention enhance a golfer's play and experience by using artificial reality (AR) messages in a perspective view from some golfer's position. The AR messages for example, tell the golfer distance to a feature such as the pin on the green or a hazard the golfer should avoid. The perspective view is from the golfer's position to the feature, with the AR message overlaid a background, giving the golfer better situation awareness for the golfer's shot and club selection.

In one form, a handheld device for assisting a golfer during the play of a golf hole is provided, and includes a display screen, a GPS receiver for determining the position of the device on said golf hole and a memory storing the location of one or more features of said golf hole. The device also includes a processor operable for comparing said position with the location of a feature to determine a distance and a display operable to show the golfer's perspective view of a background from said position to said feature. Thus, the golfer can view the display of said perspective view of the background with an augmented reality message depicting said distance imposed on the background. In one form, the feature is a location on a green of the golf hole being played and the background is a digital image. In a preferred form, the image is a photo digital image and said device includes a camera for capturing said photo digital image.

In one embodiment, a method for viewing messages at a golf event in real time comprises determining the position of the golfer on a golf course using a GPS receiver and comparing the positions of one or more features on said golf course with said golfer position. An artificial reality ("AR") message concerning said one or more features at said golf course is rendered in real time allowing viewing of the AR message with the viewpoint from said golfer position. The golfer can selectively change the viewpoint from said golfer position to another position. In a preferred form, the AR message is overlaid a photo image of a background environment, for example from the golfer's position to the green. In one form, the AR message is transmitted to spectators.

In another embodiment, the method hereof contemplates playing a golf hole using a handheld device accompanying a golfer. In this embodiment, a position of said device on said golf hole is determined using GPS and a comparison is made between the device position with a green location to determine a distance between the device position and green location. The method displays an image of a perspective view of said golf hole from said device position towards said green location and imposes an augmented reality message on said image including said distance and a marker showing approximately the green location.

DETAILED DESCRIPTION

Figure 1:
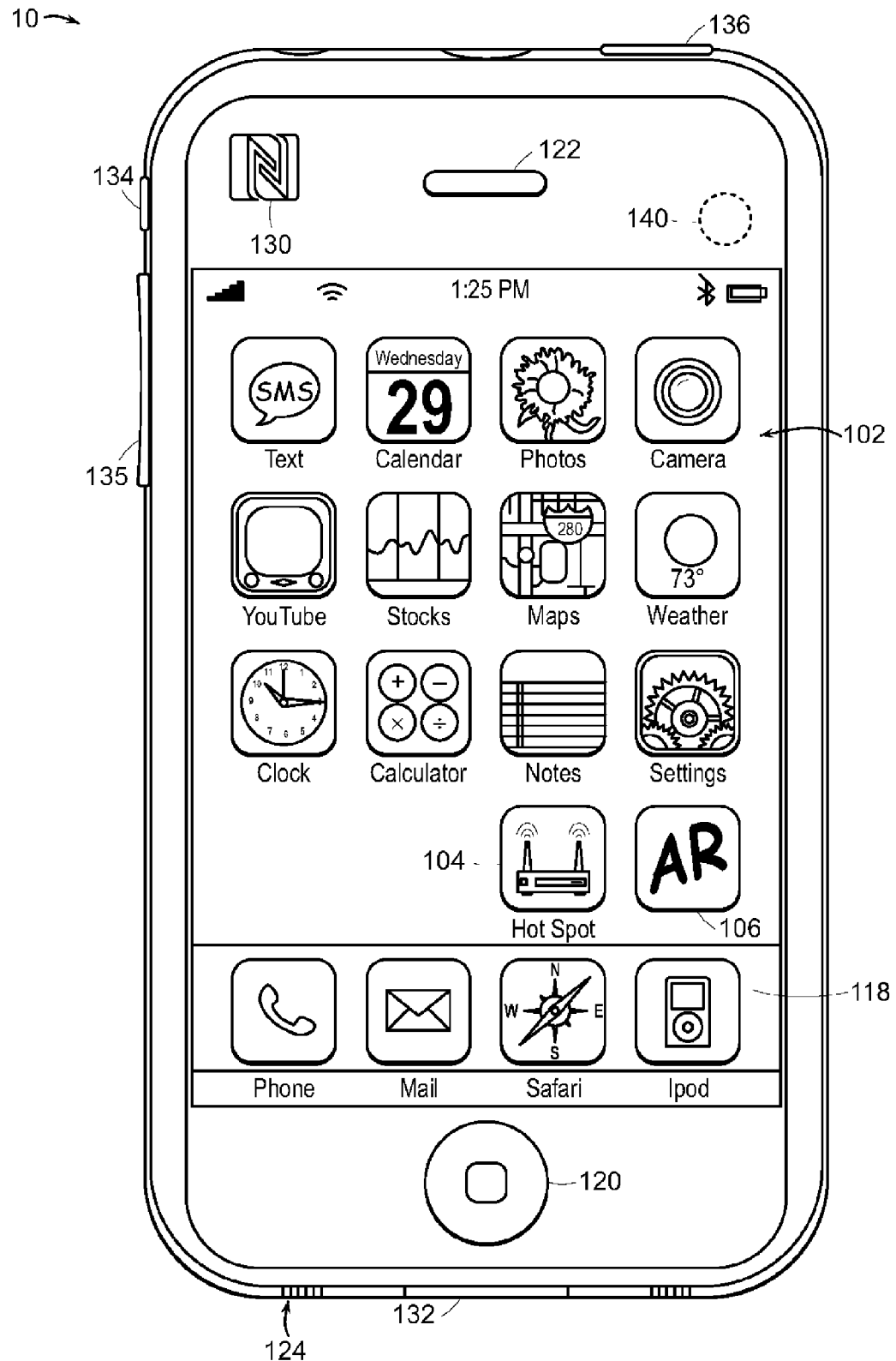
FIG. 1 is a front elevation view of a smart phone having a graphics display.

High bandwidth, wireless networks are becoming commonplace, as is the computing power of mobile devices.

Further rendering engines are becoming readily available for wide ranging applications of artificial reality. Viewing an event, such as a sporting event, using a mobile device adds greatly to the user experience. In particular, the sport of golf can be enhanced using a mobile device and artificial reality. U.S. Pat. No. 7,855,638 describes several examples of a system and method for viewing such events. In such event viewing systems, the background can be a real world image (e.g. photograph) or a virtual world rendering, but in a preferred case, artificial reality is used to enhance the perspective viewing experience.

In creating such environments for the venue of the event, such as a golf course, it is desirable to insert virtual objects into the environment, such as distance messages, pro tips, targets, shot distribution areas, warnings, etc. The virtual objects overlay a background environment, preferably as viewed from a user selected position. Typically, the user selected position is the golfer's present position as determined by GPS. Thus, in a preferred embodiment the golfer is presented with a perspective view of the golf hole under play from the golfer's current position (i.e. "viewpoint") with virtual objects visually presented to the golfer.

The present system and methods also address many golf related functions that can be used in such an artificial reality or mixed reality environment. A basic function is displaying in perspective view the golf hole from the golfer's location and identifying distances to hazards or the green. However, other functions exist, such as displaying suggested playing strategy based on the golfer's personal data or profile, a similar handicap golfer, or as suggested by tips from a pro. Further, games can be incorporated into the system and method such as corporate outing type experiences—closest to the pin, longest drive, accurate drive as measured from an artificial reality target, etc. Other functions such as contests and betting can also be incorporated.

In the present application, the term "message" is used to encompass any artificial reality or virtual object, such as distance messages, advertisements, other facts, targets, shot distribution diagrams, event information, warnings, announcements and other types of alpha numeric displays. However, the message could also be a graphic, logo or brand. It shall be understood that other objects or graphics may also be enhanced and the term "message" is understood to include other objects.

The most common positioning technology is GPS. As used herein, GPS—sometimes known as GNSS—is meant to include all of the current and future positioning systems that include satellites, such as the U.S. Navistar, GLONASS, Galileo, EGNOS, WAAS, MSAS, QZSS, etc. The accuracy of the positions, particularly of the participants, can be improved using known techniques, often called differential techniques, such as WAAS (wide area), LAAS (local area), Carrier-Phase Enhancement (CPGPS), Space Based Augmentation Systems (SBAS); Wide Area GPS Enhancement (WAGE), or Relative Kinematic Positioning (RKP). Even without differential correction, numerous improvements are increasing GPS accuracy, such as the increase in the satellite constellation, multiple frequencies ($L_1$, $L_2$, $L_5$), modeling and AGPS improvements, software receivers, and ground station improvements. Of course, the positional degree of accuracy is driven by the requirements of the application. In the golf example used to illustrate a preferred embodiment, sub five meter accuracy provided by WAAS with Assisted GPS would normally be acceptable. Further, some "events" might be held indoors and the same message enhancement techniques described herein used. Such indoor positioning systems include IMEO, Wi-Fi (Skyhook), Cell ID, pseudolites, repeaters, RSS on any electromagnetic signal (e.g. TV) and others known or developed.

The term "geo-referenced" means a message fixed to a particular location or object. Thus, the message might be fixed to a venue location, e.g., golf course fence or fixed to a moving participant, e.g., a moving golf car or player. An object is typically geo-referenced using either a positioning technology, such as GPS, but can also be geo-referenced using machine vision. If machine vision is used (i.e. object recognition), applications can be "markerless" or use "markers," sometimes known as "fiducials." Marker-based augmented reality often uses a square marker with a high contrast. In this case, four corner points of a square are detected by machine vision using the square marker and three-dimensional camera information is computed using this information. Other detectable sources have also been used, such as embedded LED's or special coatings or QR codes. Applying AR to a marker which is easily detected is advantageous in that recognition and tracking are relatively accurate, even if performed in real time. So, in applications where precise registration of the AR message in the background environment is important, a marker based system has some advantages.

In a "markerless" system, AR uses a general natural image instead of a fiducial. In general, markerless AR use a feature point matching method. Feature point matching refers to an operation for searching for and connecting the same feature points in two different images. A method for extracting a plane using a Simultaneous Localization and Map-building (SLAM)/Parallel Tracking And Mapping (PTAM) algorithm for tracking three-dimensional positional information of a camera and three-dimensional positional information of feature points in real time and providing AR using the plane has been suggested. However, since the SLAM/PTAM algorithm acquires the image so as to search for the feature points, computes the three-dimensional position of the camera and the three-dimensional positions of the feature points, and provides AR based on such information, a considerable computation is necessary. A hybrid system can also be used where a readily recognized symbol or brand is geo-referenced and machine vision substitutes the AR message.

In the present application, the golf course can be a real view or depicted as a photo background environment or a virtual environment, or a mixture, sometimes referred to as "mixed reality." A convenient way of understanding the messages of the present invention is as a layer of artificial reality or "augmented reality" messages overlaid the golf course background. There are different methods of creating the golf course background as understood by one of ordinary skill in the art. For example, an artificial background environment can be created by a number of rendering engines, sometimes known as a "virtual" environment. See, e.g., Nokia's (through its Navteq subsidiary) Journey View which blends digital images of a real environment with an artificial 3D rendering. A real environment can be the background as seen through glasses of FIG. 9, but can also be created using a digital image. Such a digital image can be stored and retrieved for use, such as a "street view" or photo, video, or panorama, or other type of stored image. Alternatively, many mobile devices have a camera for capturing a digital image which can be used as the background environment. Such a camera-sourced digital image may come from the user, friends, social network groups, crowd-sourced, or service provided. Because the use of a real environment as the background is common, "augmented reality" (AR) often refers to a technology of inserting a virtual reality graphic (object) into an actual digital image and generating an image in which a real object and a virtual object are mixed (i.e. "mixed reality"). AR is characterized in that supplementary information using a virtual graphic may be layered or provided onto an image acquired of the real world. Multiple layers of real and virtual reality can be mixed. In such applications the placement of an object or "registration" with other layers is important. That is, the position of objects or layers relative to each other based on a positioning system should be close enough to support the application. As used herein, "artificial reality" ("AR") is sometimes used interchangeably with "mixed" or "augmented" reality, it being understood that the background environment can be real or virtual.

I. Overview

Turning to the drawings, an illustrative embodiment uses a mobile device, such as smart phone 10 of FIG. 1, accompanying the golfer. The golfer selects AR application 106 on the touch sensitive graphics display 102. Smart phone 10 includes a variety of sensors, including a GPS unit for determining its location, a gyroscope for determining the orientation, an accelerometer, ambient light sensor and a digital compass. Additionally, phone 10 includes one or more radios, such as a packet radio, a cell radio, WiFi, Bluetooth, and near field. Of course, other devices can be used such as the dedicated golf handheld devices as well as a tablet computer having GPS, especially the tablets with screen sizes larger than a smart phone but smaller than about 10 inches to aid portability, such as a Dell Streak, Motorola Xoom, or Samsung Galaxy. In some embodiments, the device can be a tablet affixed to a golf cart with a camera oriented in the direction of travel. That is, in some embodiments, a wireless camera connected to a Bluetooth compatible device 10 may be preferred. Examples of such cameras are JonesCAM LX, Vuzix iWear CamAR available from Vuzix Corporation, Rochester, N.Y., AT-1Wireless available from Dogcam, and ContourGPS available from Contour HD.

Figure 2:
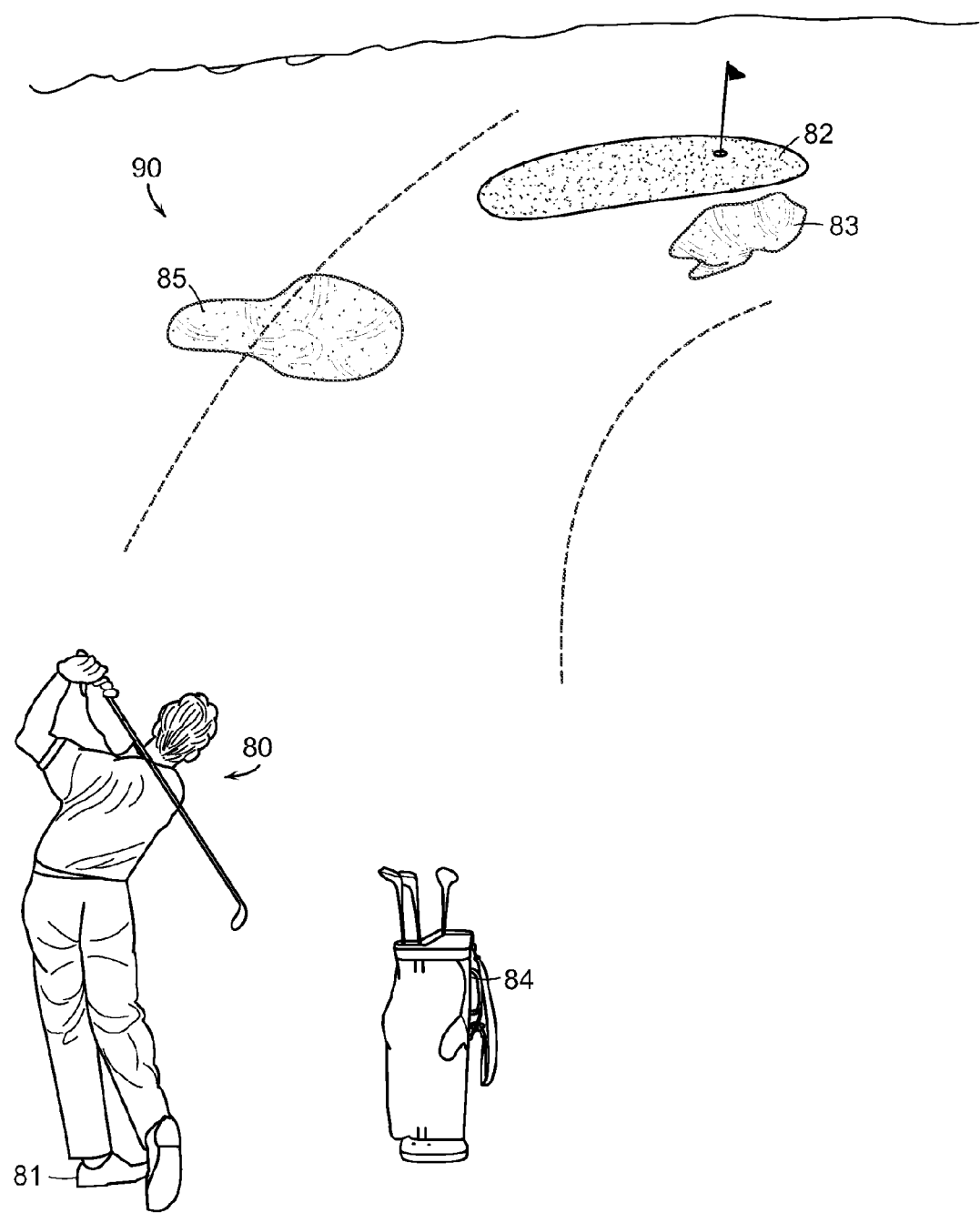
FIG. 2 is a perspective view of a golf hole being played.

FIG. 2 is an illustrative example of golf hole 90 used to describe aspects of the present invention. In this case, player 80 is shooting to green 82 and accompanied by his golf bag 84 while holding device 10 oriented towards green 82. Lake 85 presents a significant hazard to the golfer, as does green side bunker 83. For illustrative purposes, in FIG. 2 the pin on green 82 is 232 yards from the golfer's current location 81, while the near side of lake 85 is 175 yards, and the far side of lake 85 or carry distance on a line between the current location and the pin is 194 yards.

Figure 3:
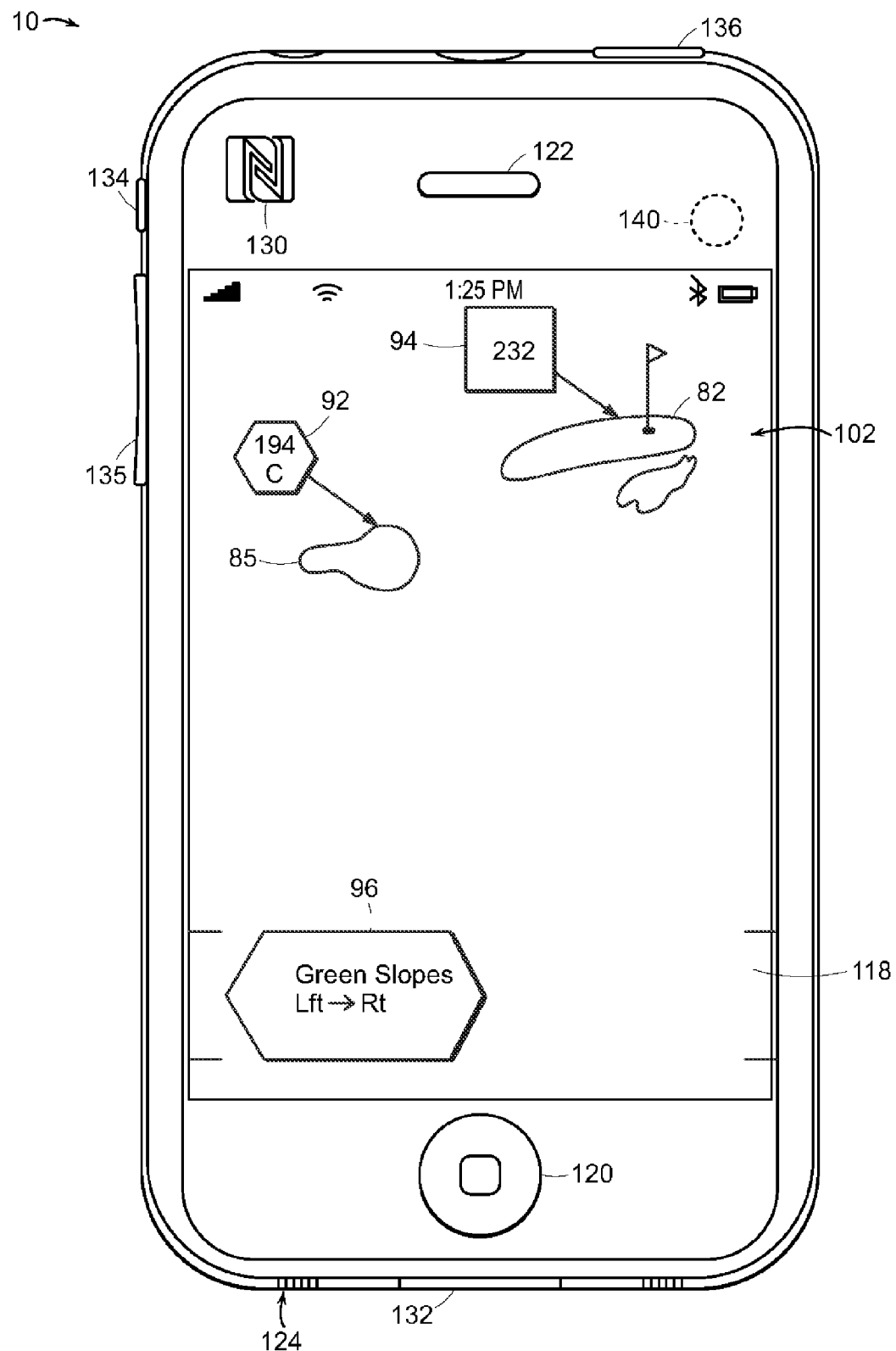
FIG. 3 is a front elevation view of the smart phone of FIG. 1 showing one representation of the golf hole of FIG. 2.

FIG. 3 illustrates the perspective view of golf hole 90 of FIG. 2 as seen on smart phone 10 from the golfer's current location 81. As can be seen, artificial reality message 92 shows that 194 yards is necessary to carry lake 85. Further, AR message 94 shows that the pin is 232 yards from the golfer's current location 81. Further, a pro tip AR message 96 gives the golfer some insight into the green slope. The AR messages can be color coded if desired, e.g., blue for distance and red marking a boundary or hazard.

Figure 9:
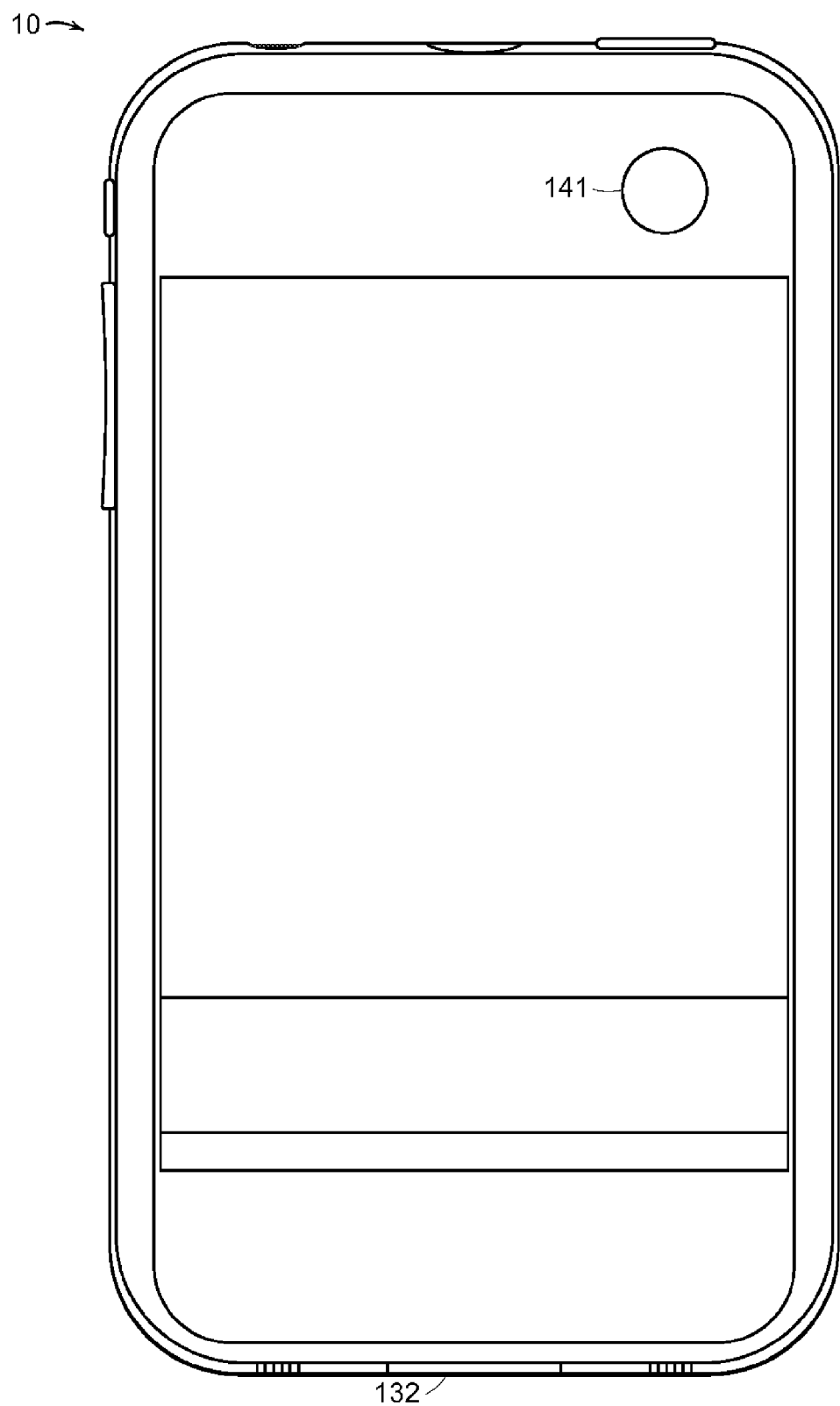
FIG. 9 is a perspective of a portable device where the functionality is built into glasses or goggles worn.

In a preferred embodiment, smart phone 10 is held in the golfer's hand is vertically oriented and positioned in the direction of the desired shot, such as from golfer 80 to green 82 as shown in FIG. 2. The background of the perspective view of golf hole 90 on display 102 is from the GPS determined position of phone 10 using backside camera 141 (FIG. 9). In a preferred embodiment, backside camera 141 is used in phone 10 to provide a photo background from the camera. The AR messages are overlaid the background as seen in FIG. 3. In an alternative embodiment, a virtual background is used and player 80 can more easily select another location, such as behind the golfer or from the green to the golfer for viewing the play of a golf round. The ability to select a starting location or viewpoint is particularly useful when golfer 80 is replaying his round at a later date on a home computing device.

Figure 4:
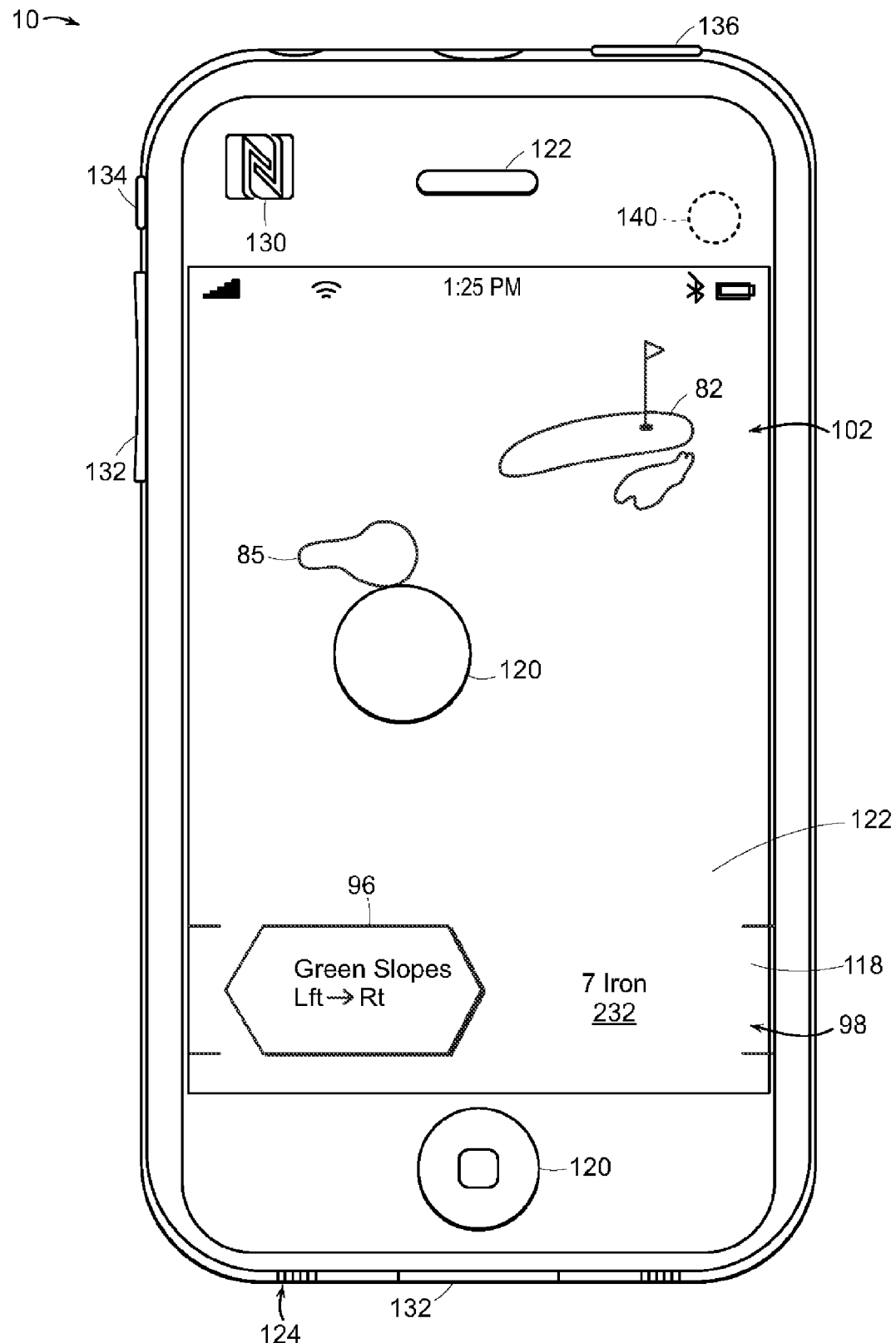
FIG. 4 is a front elevation view of the smart phone of FIG. 1 showing another representation of the golf hole of FIG. 2.

In FIG. 4, AR target area message 120 is illustrated. In this embodiment, golfer 80 is an average handicap golfer whose personal profile shows a shot distribution of a 7 Iron as 145 yards to 165 yards with a 20 yard diameter (i.e. 155 yards with a 20 yard CEP). As discussed below, shot distribution can be highly customized to include actual club use, as adjusted by current winds, density altitude, equipment used, and elevation, or can be a normalized distribution selected by the golfer for a particular skill level. In any event, the device 10 shows target 120 and suggested club for use in window 122. Note that window 98 is used to always show distance to pin (or an approximation such as center of green). In the case illustrated in FIG. 4, the suggestion is to lay up short and to the right of lake 85 using a 7 iron.

Figure 5:
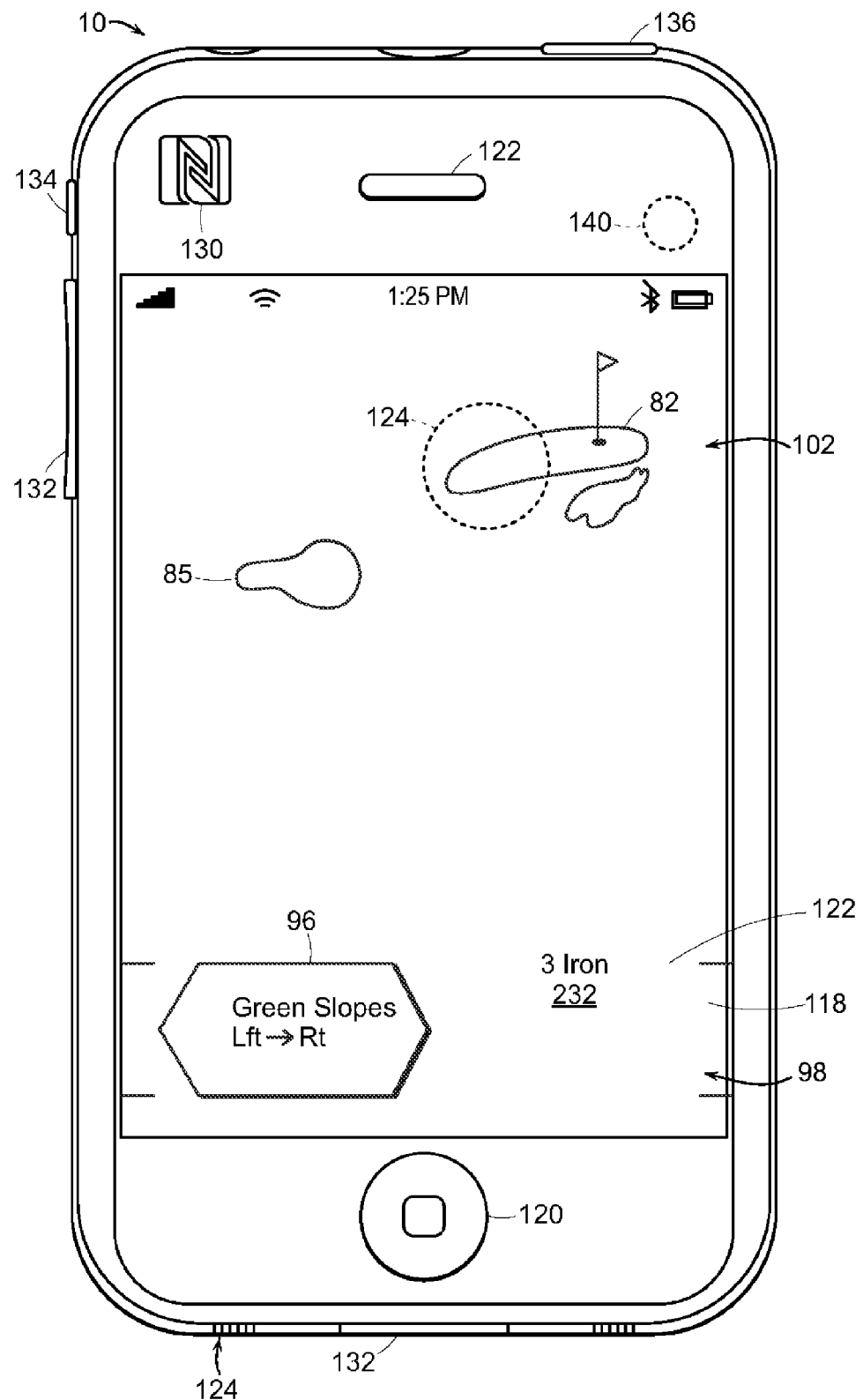
FIG. 5 is a front elevation view of the smart phone of FIG. 1 showing another representation of the golf hole of FIG. 2.

FIG. 5 is similar to FIG. 4, but in this case golfer 80 has an above average personal profile. In this case, the personal profile shows a shot distribution of a 3 Iron as 195 yards to 225 yards with a 30 yard diameter (i.e. 210 yards with a 30 yard CEP). In the case illustrated in FIG. 5, the suggestion is to carry lake 85 aiming for the left side of green 82 aiming for target area 124 using a 3 iron.

Figure 6:
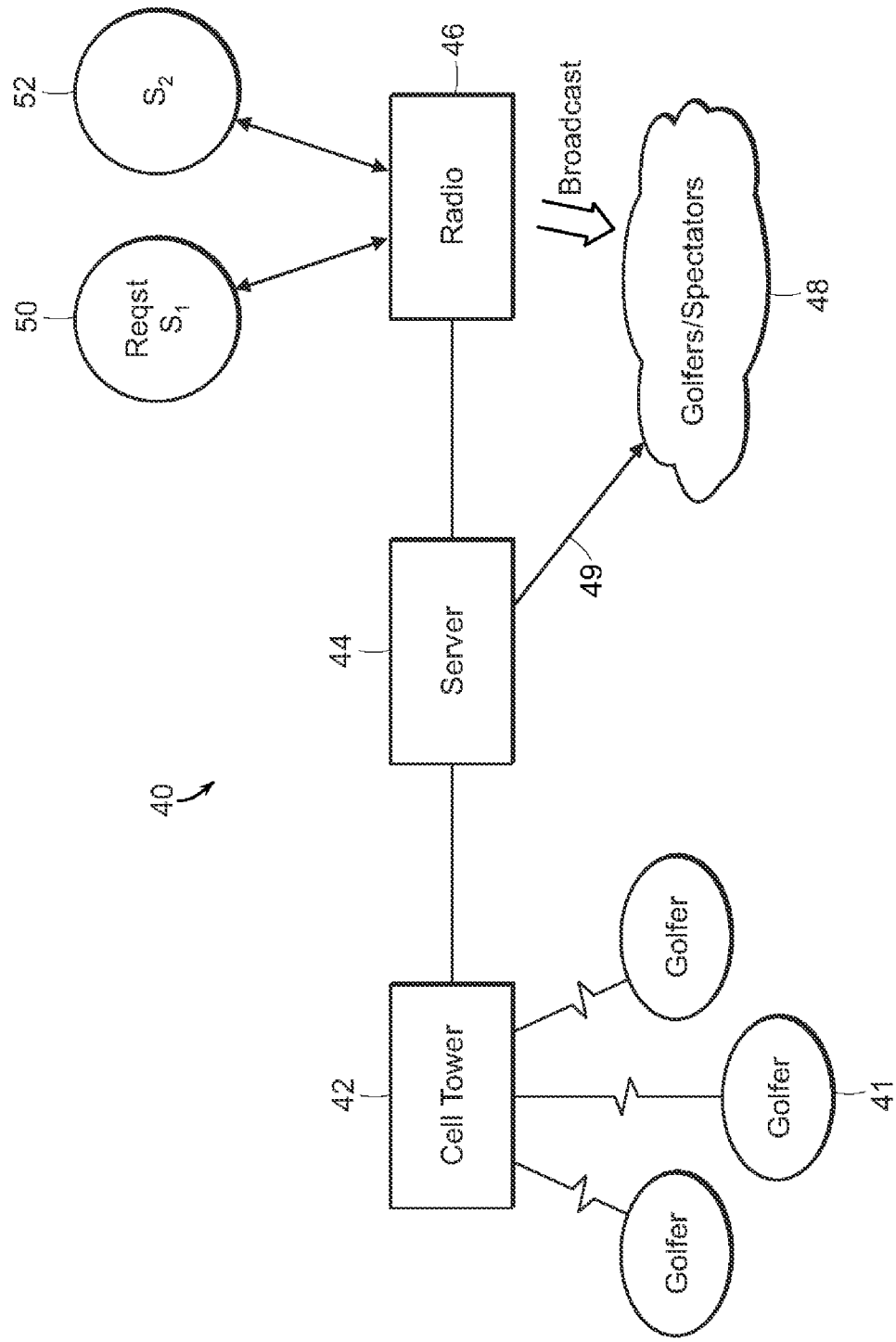
FIG. 6 is a block diagram depicting a wireless, client server architecture in accordance with a preferred embodiment of the present invention.

FIG. 6 illustrates network 40 for the golf course which is useful in some embodiments of the methods and systems of the present invention. A number of golfers 41 are equipped with a positioning mechanism, such as GPS, with position and other information transmitted by radio to cell tower 42 connected to server 44. Cell tower 42 can be part of a conventional cell network or be an independent picocell or femtocell as is known in the art. The GPS derived position of each golfer 41 can be corrected and accuracy improved if desired, but is usually less than 5 meters. The golfer positions can be used by server 44 (e.g. located in the club house) and can be transmitted by radio 46 to any or all golfers/spectators 48 if desired. Groups can be formed or pre-established and information distributed to one or more groups. That is, each golfer/spectator 48 has a smart phone 10 for receiving the transmitted participant positions. Of course, server 44 can also transmit golfer position information to the club house, remote, or home spectators via Internet connection 49. Such home or club house spectators can, if desired, call up a screen on their TV or alternatively, watch the golf match on a home computer or other device.

II. Mobile Device

In more detail, FIG. 1 is a front elevational view of a smart phone or mobile device 10, which is the preferred form factor for the device discussed herein to illustrate certain aspects of the present invention. Mobile device 10 can be, for example, a handheld computer, a tablet computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing.

Mobile device 10 includes a touch-sensitive graphics display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

The touch-sensitive graphics display 102 can comprise a multi-touch-sensitive display. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. An example of a multi-touch-sensitive display technology is described in U.S. Pat. Nos. 6,323,846; 6,570,557; 6,677,932; and U.S. Patent Application Publication No. 2002/0015024, each of which is incorporated by reference herein in its entirety. Touch screen 102 and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 102.

Mobile device 10 can display one or more graphical user interfaces on the touch-sensitive display 102 for providing the user access to various system objects and for conveying information to the user. The graphical user interface can include one or more display objects 104, 106. Each of the display objects 104, 106 can be a graphic representation of a system object. Some examples of system objects include device functions, applications, windows, files, alerts, events, or other identifiable system objects.

Mobile device 10 can implement multiple device functionalities, such as a telephony device, as indicated by a phone object; an e-mail device, as indicated by the e-mail object; a network data communication device, as indicated by the Web object; a Wi-Fi base station device (not shown); and a media processing device, as indicated by the media player object. For convenience, the device objects, e.g., the phone object, the e-mail object, the Web object, and the media player object, can be displayed in menu bar 118.

Each of the device functionalities can be accessed from a top-level graphical user interface, such as the graphical user interface illustrated in FIG. 1. Touching one of the objects e.g. 104, 106, etc. can, for example, invoke the corresponding functionality. In the illustrated embodiment, object 106 represents an Artificial Reality application in accordance with the present invention.

Upon invocation of particular device functionality, the graphical user interface of mobile device 10 changes, or is augmented or replaced with another user interface or user interface elements, to facilitate user access to particular functions associated with the corresponding device functionality. For example, in response to a user touching the phone object, the graphical user interface of the touch-sensitive display 102 may present display objects related to various phone functions; likewise, touching of the email object may cause the graphical user interface to present display objects related to various e-mail functions; touching the Web object may cause the graphical user interface to present display objects related to various Web-surfing functions; and touching the media player object may cause the graphical user interface to present display objects related to various media processing functions.

The top-level graphical user interface environment or state of FIG. 1 can be restored by pressing button 120 located near the bottom of mobile device 10. Each corresponding device functionality may have corresponding "home" display objects displayed on the touch-sensitive display 102, and the graphical user interface environment of FIG. 1 can be restored by pressing the "home" display object.

The top-level graphical user interface is shown in FIG. 1 and can include additional display objects, such as a short messaging service (SMS) object, a calendar object, a photos object, a camera object, a calculator object, a stocks object, a weather object, a maps object, a notes object, a clock object, an address book object, and a settings object, as well as AR object 106. Touching the SMS display object can, for example, invoke an SMS messaging environment and supporting functionality. Likewise, each selection of a display object can invoke a corresponding object environment and functionality.

Mobile device 10 can include one or more input/output (I/O) devices and/or sensor devices. For example, speaker 122 and microphone 124 can be included to facilitate voice-enabled functionalities, such as phone and voice mail functions. In some implementations, loud speaker 122 can be included to facilitate hands-free voice functionalities, such as speaker phone functions. An audio jack can also be included for use of headphones and/or a microphone.

A proximity sensor (not shown) can be included to facilitate the detection of the user positioning mobile device 10 proximate to the user's ear and, in response, disengage the touch-sensitive display 102 to prevent accidental function invocations. In some implementations, the touch-sensitive display 102 can be turned off to conserve additional power when mobile device 10 is proximate to the user's ear.

Other sensors can also be used. For example, an ambient light sensor (not shown) can be utilized to facilitate adjusting the brightness of the touch-sensitive display 102. An accelerometer (not shown) can be utilized to detect movement of mobile device 10, as indicated by the directional arrow. Accordingly, display objects and/or media can be presented according to a detected orientation, e.g., portrait or landscape.

Mobile device 10 may include circuitry and sensors for supporting a location determining capability, such as that provided by the global positioning system (GPS) or other positioning system (e.g., Cell ID, systems using Wi-Fi access points, television signals, cellular grids, Uniform Resource Locators (URLs)). A positioning system (e.g., a GPS receiver) can be integrated into the mobile device 10 or provided as a separate device that can be coupled to the mobile device 10 through an interface (e.g., port device 132) to provide access to location-based services.

Mobile device 10 can also include a front camera lens and sensor 140. In a preferred implementation, a backside camera lens and sensor 141 is located on the back surface of the mobile device 10 as shown in FIG. 9. The cameras 140, 141 can capture still images and/or video. The camera subsystems and optical sensors 140, 141 may comprise, e.g., a charged coupled device (CCD) or a complementary metal-oxide semiconductor (CMOS) optical sensor, can be utilized to facilitate camera functions, such as recording photographs and video clips. Camera controls (zoom, pan, capture and store) can be incorporated into buttons 134-136 (FIG. 1.)

The preferred mobile device 10 includes a GPS positioning system. In this configuration, another positioning system can be provided by a separate device coupled to the mobile device 10, or can be provided internal to the mobile device. Such a positioning system can employ positioning technology including a GPS, a cellular grid, URL's, IMEO, pseudolites, repeaters, Wi-Fi or any other technology for determining the geographic location of a device. The positioning system can employ a service provided by a positioning service such as, for example, a Wi-Fi RSS system from SkyHook Wireless of Boston, Mass., or Rosum Corporation of Mountain View, Calif. In other implementations, the positioning system can be provided by an accelerometer and a compass using dead reckoning techniques starting from a known (e.g. determined by GPS) location. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system can be provided by using wireless signal strength and one or more locations of known wireless signal sources (Wi-Fi, TV, FM) to provide the current location. Wireless signal sources can include access points and/or cellular towers. Other techniques to determine a current location of the mobile device 10 can be used and other configurations of the positioning system are possible.

Mobile device 10 can also include one or more wireless communication subsystems, such as a 802.11b/g/n communication device, and/or a Bluetooth™ communication device, in addition to near field communications. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc. Additional sensors are incorporated into the device 10, such as accelerometer, digital compass and gyroscope. Further, peripheral sensors, devices and subsystems can be coupled to peripherals interface 132 to facilitate multiple functionalities. For example, a motion sensor, a light sensor, and a proximity sensor can be coupled to peripherals interface 132 to facilitate the orientation, lighting and proximity functions described with respect to FIG. 1. Other sensors can also be connected to peripherals interface 132, such as a GPS receiver, a temperature sensor, a biometric sensor, or other sensing device, to facilitate related functionalities.

Port device 132, is e.g., a Universal Serial Bus (USB) port, or a docking port, or some other wired port connection. Port device 132 can, for example, be utilized to establish a wired connection to other computing devices, such as other communication devices 10, a personal computer, a printer, or other processing devices capable of receiving and/or transmitting data. In some implementations, port device 132 allows mobile device 10 to synchronize with a host device using one or more protocols.

Input/output and operational buttons are shown at 134-136 to control the operation of device 10 in addition to, or in lieu of the touch sensitive screen 102. Mobile device 10 can include a memory interface to one or more data processors, image processors and/or central processing units, and a peripherals interface. The memory interface, the one or more processors and/or the peripherals interface can be separate components or can be integrated in one or more integrated circuits. The various components in mobile device 10 can be coupled by one or more communication buses or signal lines.

Preferably, the mobile device includes a graphics processing unit (GPU) coupled to the CPU. While a Nvidia GeForce GPU is preferred, in part because of the availability of CUDA, any GPU compatible with OpenGL is acceptable. Tools available from Kronos allow for rapid development of 3D models.

The I/O subsystem can include a touch screen controller and/or other input controller(s). The touch-screen controller can be coupled to touch screen 102. The other input controller(s) can be coupled to other input/control devices 132-136, such as one or more buttons, rocker switches, thumb-wheel, infrared port, USB port, and/or a pointer device such as a stylus. The one or more buttons (132-136) can include an up/down button for volume control of speaker 122 and/or microphone 124, or to control operation of cameras 140, 141.

In one implementation, a pressing of button 136 for a first duration may disengage a lock of touch screen 102; and a pressing of the button for a second duration that is longer than the first duration may turn the power on or off to mobile device 10. The user may be able to customize a functionality of one or more of the buttons. Touch screen 102 can, for example, also be used to implement virtual or soft buttons and/or a keyboard.

In some implementations, mobile device 10 can present recorded audio and/or video files, such as MP3, AAC, and MPEG files. In some implementations, mobile device 10 can include the functionality of an MP3 player, such as an iPod™. Mobile device 10 may, therefore, include a 36-pin connector that is compatible with the iPod. Other input/output and control devices can also be used.

The memory interface can be coupled to a memory. The memory can include high-speed random access memory and/or non-volatile memory, such as one or more magnetic disk storage devices, one or more optical storage devices, and/or flash memory (e.g., NAND, NOR). The memory can store an operating system, such as Darwin, RTXC, LINUX, UNIX, OS X, WINDOWS, or an embedded operating system such as VxWorks. The operating system may include instructions for handling basic system services and for performing hardware dependent tasks. In some implementations, the operating system handles timekeeping tasks, including maintaining the date and time (e.g., a clock) on the mobile device 10. In some implementations, the operating system can be a kernel (e.g., UNIX kernel).

The memory may also store communication instructions to facilitate communicating with one or more additional devices, one or more computers and/or one or more servers. The memory may include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/Navigation instructions to facilitate GPS and navigation-related processes and instructions; camera instructions to facilitate camera-related processes and functions; other software instructions to facilitate other related processes and functions; and/or diagnostic instructions to facilitate diagnostic processes and functions. The memory can also store data, including but not limited to coarse information, locations (points of interest), personal profile, documents, images, video files, audio files, and other data. The information can be stored and accessed using known methods, such as a structured or relative database.

Figure 8:
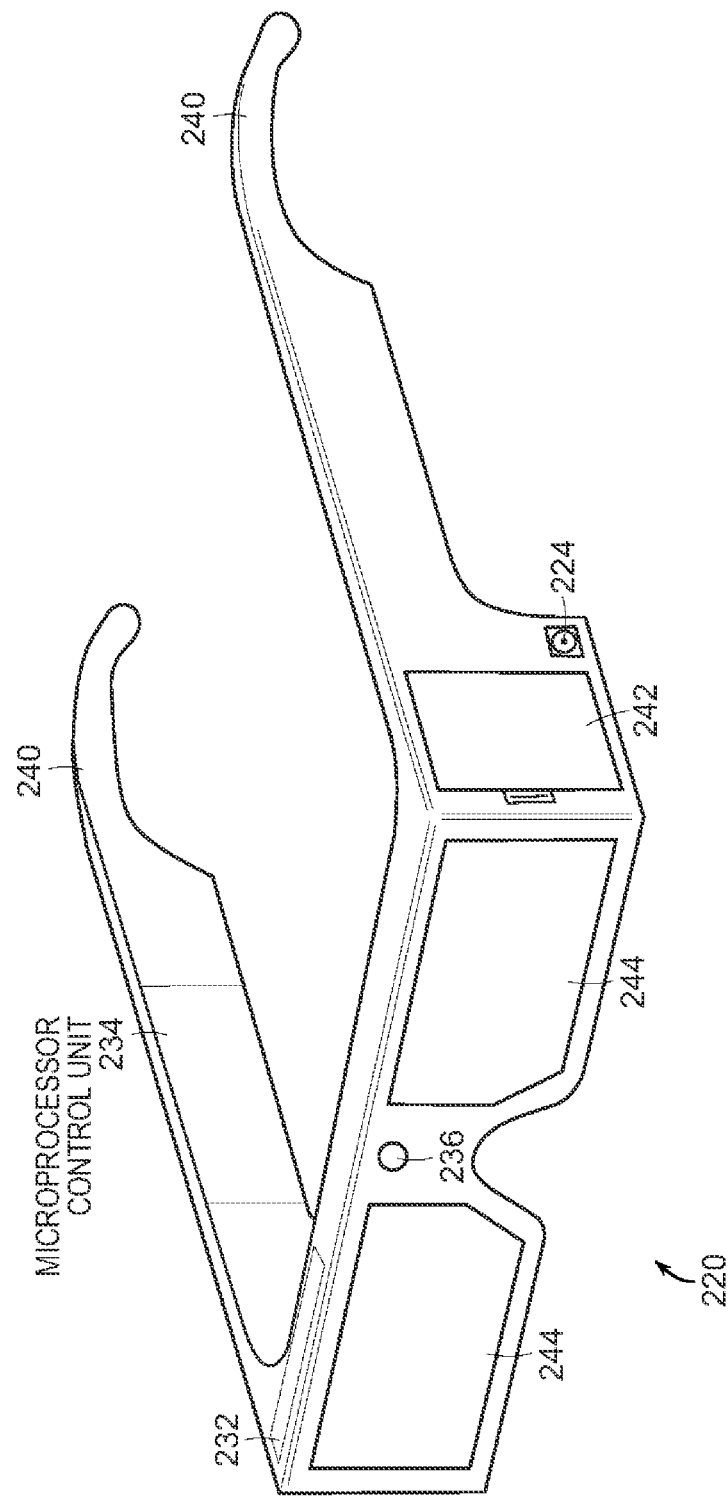
FIG. 8 is a perspective of the back side the smart phone of FIG. 1.

Portable device 220 of FIG. 8 is an alternative embodiment in the configuration of glasses or goggles and includes a GPS and patch antenna 232, microprocessor 234, and radio 236. Controls, such as the directional pad 224, are on the side frames (opposite side not shown). Batteries are stored in compartment 242. The displays are transparent LCD's as at 244. Examples of such a device are the MyVue headset made by MicroOptical Corp. of Westwood, Mass. (see, U.S. Pat. No. 6,879,443), Vuzix Wrap 920 AR, 1200 VR, and Tac-Eye LT available from Vuzix Corporation, Rochester, N.Y. A particular benefit of the use of wearable glasses such as the embodiment of FIG. 8 is the ability to incorporate augmented reality messages, e.g. point of interest overlays onto the "real" background. In the golf example, a golfer wearing glasses 220 can see the AR messages and selectively highlight a particular message and additional information relative to that message (e.g. wind used in club selection, next best club selection, status of other golfers rounds, etc.). See, e.g. U.S. Pat. Nos.

7,002,551; 6,919,867; 7,046,214; 6,945,869; 6,903,752; 6,317,127 (herein incorporated by reference).

III. Network Operating Environment

It should be understood that in many uses a network environment is not necessary. For example, golfer 80 can preload his personal profile on device 10 and a generic or specific form of the golf course under play. The preload can be via internet, celluar network, WiFi, Bluetooth, or near field communication or other remote communication with a server having the points of interest for the golf course under play. A specific form of the course might include the current tees and green placement from a server populated by the course, e.g. pro shop and use an artificial reality background or photo background.

In FIG. 6, a depiction of network 40 useful in many embodiments is shown. Golfers 41 communicate with cell base station 42 preferably using the cellular network which can include one or more femtocells or picocells. While simple data can be transmitted on the control plane (e.g. GPRS) preferably the cell radio uses a data plan, i.e. the user plane. The location and other data is communicated to server 44, which can be located at the golf course or in a preferred case, simply a network server for multiple courses. Such other data can, in addition to sensor data derived from device 10, comprise sensor data from the participant, such as from instrumented golf clubs. See, e.g. U.S. Pat. App. Nos. 20110143848 and 20080051208 (incorporated by reference).

Server 44 stores the position and other data of each golfer 41 communicated to base station 42, and other pertinent data such as golfer shot position, scores, etc. In a preferred form, server 44 stores the points of interest or course database which is used to create many of the AR messages. Further, other golfers can send messages to selected golfers or groups of golfers which are stored on server 44. For example, a location (green or feature) of a golf course can be "tagged" with an AR message to other golfers (e.g. "Joe hit OB here"). Of course, server 44 can store advertising messages as well for delivery to golfers, such as specials in the pro shop or "deal of the day" such as living social or Groupon opportunities. Server 44 can also be used for authentication of graphic devices 10 and enable selectable purchases from golfers (i.e. refreshments or for delivery or pickup at the turn, or balls, etc). Server 44 can also process the incoming position data to increase the accuracy if desired. For example, server 44 can include its own base station GPS and apply a correction to a golfer's position if desired. However, in the embodiment of FIG. 6 using the cellular network, assuming Assisted GPS is available and used, improving time to first fix, sensitivity and accuracy so additional accuracy is not normally deemed necessary.

In some applications, golfers 41 might broadcast location information directly to other golfers, i.e. without an intervening server using a WLAN or peer-to-peer network topology. Radio 46 is used to communicate on a broadcast basis to all golfers/spectators 48 in attendance—here using the cell network again. 4G cellular networks such as LTE, or Long Term Evolution, have download speeds (e.g. 12 mbps) surpassing WiFi and may become acceptable substitutes. For example, WiMax (Sprint>10 mbps); LTE (Verizon 40-50 mbps) (AT&T unknown); and HSPA+ (T mobile 21 mbps) (AT&T 16 mbps) appear acceptable 4G network speeds. In many cases, with high performance 4G cellular networks server 44 need not be local, i.e. proximate to the golf course. However, if a cell network is not used, the radio 46 of network of FIG. 6 can be local, i.e. a WiFi or 900 Mhz local area network is used. In this case radio 46 preferably uses WiFi (802.11b/g/n) to transmit to golfers/spectators 48.

The GPS position information of golfer 41 is compared to the course database to compute a desired outcome, e.g., the desired outcome may be as illustrated in FIG. 4, to use a 7 iron to lay up short of lake 85. Device 10 in the hands of golfer 41 displays the views illustrated, for example, in FIGS. 3-5. The amount of processing occurring at device 10 versus server 44 depends on the function requested and the capabilities of the network communication as well as the capabilities of device 10; accordingly, this is a design choice.

Special requests from golfers/spectators 48 can be made to server 44, such as for streaming video of a particular scene (e.g. a "flyover" of the hole), refreshment orders, memorabilia purchases, etc. This function is shown at 50, 52 in FIG. 6.

Some spectators 48 may be remote from the sporting event. In this case, server 44 can transmit the desired information over internet connection 49 to the club house, home computer or television remote from the event. While one embodiment has been described in the context of a spectator in physical attendance at the golf course with information broadcast by radio, the use of device 10 at remote locations is equally feasible. In another embodiment more suited for remote locations, for example, portable device 10 can be used at home while watching a golf event on TV, with the participant location and other information streaming over the internet. WiFi in the home is a preferred mode of broadcasting the information between the portable device and the network.

Another example of remote viewing might be a replay of a round by a golfer. That is, the views of FIGS. 2-5 can be accomplished using any graphic device, including a personal computer, tablet, or a cell phone. Similar to using graphic device 10 coupled to the internet, a personal computer user can select the source or position of origination of the desired view, and the target or orientation from the source or target. Elevations, zoom, pan, tilt, etc. may be selected by the remote user as desired to change the origin viewpoint or size.

In "my view," for example, the remote location graphic device might display only information from the golfer's shot location 81. Alternatively, the spectator might want a selectable view, such as overhead in plan form, from behind the golfer (FIG. 2) or other location such as from the pin to the golfer's location. In any of these modes, the remote location spectator could zoom, pan or tilt as described above, freeze, slow motion, replay, etc. to obtain a selected view on the portable device 10.

While the preferred embodiment contemplates most processing occurring at device 10, different amounts of preprocessing of the position data can be processed at server 44. For example, the participant information can be differentially corrected at the server (e.g. in addition to WAAS or a local area differential correction) or at device 10 or even information post-processed with carrier phase differential to achieve centimeter accuracy. Further, it is anticipated that most of the graphics rendering can be accomplished at portable device 10, but an engineering choice would be to preprocesses some of the location and rendering information at server 44 prior to broadcast. In particular, many smart phones and handheld computers include GPU's which enable photorealistic rendering and the developers have access to advanced tools for development such as OpenGL and CUDA.

Mobile device 10 of FIGS. 1 and 9 preferably accompanies some of golfers 41 of FIG. 6 in attendance at the course. Devices 10 communicate over one or more wired and/or wireless networks 46 in data communication with server 44. In addition, the devices can communicate with a wireless network, e.g., a cellular network, or communicate with a wide area network (WAN), such as the Internet, by use of a gateway. Likewise, an access point associated with Radio 46, such as an 802.11b/g/n wireless access point, can provide communication access to a wide area network.

Both voice and data communications can be established over the wireless network of FIG. 6 and access point 46 or using a cellular network. For example, mobile device 10 a can place and receive phone calls (e.g., using VoIP protocols), send and receive e-mail messages (e.g., using POP3 protocol), and retrieve electronic documents and/or streams, such as web pages, photographs, and videos, over the wireless network, gateway, and wide area network (e.g., using TCP/IP or UDP protocols). Likewise, mobile device 10 can place and receive phone calls, send and receive e-mail messages, and retrieve electronic documents over access point 46 and the wide area network. In some implementations, mobile device 10 can be physically connected to access point 46 using one or more cables and the access point can be a personal computer. In this configuration, mobile device 10 can be referred to as a "tethered" device.

Mobile devices 10 can also establish communications by other means. For example, wireless device 10 can communicate with other wireless devices, e.g., other wireless devices 10, cell phones, etc., over a wireless network. Likewise, mobile devices 10 can establish peer-to-peer communications, e.g., a personal area network, by use of one or more communication subsystems, such as the Bluetooth™ communication device. Other communication protocols and topologies can also be implemented. The golf clubs of golfer 80 in bag 82 (FIG. 1) can be instrumented and their data communicated to device 10 for later use or communicated to network 40.

In a preferred use in the play of golf, it is believed preferable to use a real environment as the background, such as a digital image captured by backside camera 141. In other embodiments, a virtual environment may be used as the background. In such cases, server 44 preferably uses the OTOY, Gaikai, or OnLive video compression technology to transmit the participant position information the virtual background environment, as well as the AR objects, such as each car 54. OTOY (and Gaikai and OnLive) are cloud based gaming and application vendors that can transmit real time photorealistic gaming to remote gamers. Such companies that render photorealistic 3D games for realtime remote play are Otoy, see, e.g., www.otoy.com; OnLive, see, e.g., en.wikipedia.org/wiki/OnLive; and Gaikai, see, e.g., technabob.com/blog/2010/03/16/gaikai-cloud-based-gaming. Onlive, for example, advertises that with 5 mbps it can transfer 220 frames per second with 12-17 ms latency, employed advanced graphics—ajax, flash, Java, ActiveX.

The goal is high performance game systems that are hardware and software agnostic. That is, a goal is intense game processing performed on a remote server and communicated to the remote user. Using such cloud based gaming technology, smart phones 10 can run any of the advanced browsers (e.g. IE9 or Chrome) running HTML5 that support 3D graphics. However, other AR specific browsers can alternatively be used, such as available from Layar, Junaio, Wikitude, Sekai Camera or Mixare (www.mixare.org). While OTOY (and Gaikai and OnLive) promise no discernable latency in their gaming environment, server 44 for the golf event of FIG. 6 is preferably placed at the venue of the event.

Therefore, the amount of processing occurring at server 44 versus device 10 is a design choice based on the event, the background, the radio network available, the computational and display capability available at device 10 or other factors.

Figure 7:
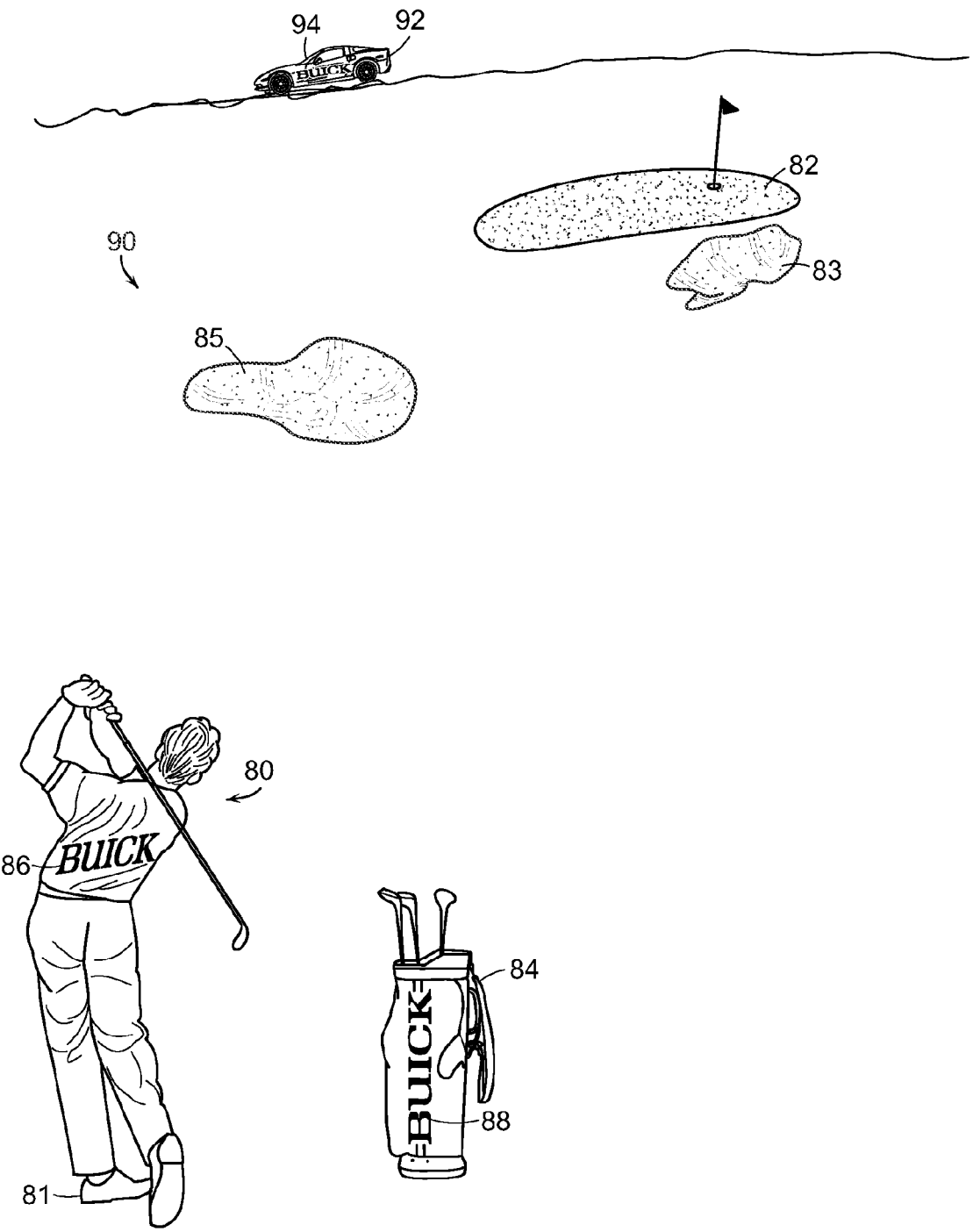
FIG. 7 is a perspective view of a golf hole from a selected location, similar to FIG. 2.

In addition the content of the advertisement messages can be changed based on context. Such smart phones 10 have not only machine ID's, but also search history, location history, and even personal information. Further, the user might be identified based on social media participation—e.g. Facebook or Twitter accounts. Such information is considered "context" in the present application, along with the typical demographics of an event and "marketing factors" as previously discussed. That is, the event might have its own context which indicates the demographic profile of most of the spectators at the event. A golf match might have a context of golf spectators with adequate disposable income to purchase a vehicle. Therefore, advertising a Buick as shown in FIG. 7 makes advertising sense.

IV. Graphics

The graphics generated on screen 102 can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 102 are 3D. OpenGL and Direct3D are two popular APIs for the generation of real-time imagery in 3D. Real-time means that image generation occurs in "real time" or "on the fly"). Many modern graphics cards provide some degree of hardware acceleration based on these APIs, frequently enabling the display of complex 3D graphics in real-time. However, it's not necessary to employ any one of these to actually create 3D imagery. The graphics pipeline technology is advancing dramatically, mainly driven by gaming applications enabling more realistic 3D synthetic renderings of FIGS. 1-5.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card.

These APIs for 3D computer graphics are particularly popular:
OpenGL and the OpenGL Shading Language
OpenGL ES 3D API for embedded devices
Direct3D (a subset of DirectX)
RenderMan
RenderWare
Glide API
TruDimension LC Glasses and 3D monitor API
OpenGL is widely used and many tools are available from firms such as Kronos. There are also higher-level 3D scene-graph APIs which provide additional functionality on top of the lower-level rendering API. Such libraries under active development include:
QSDK
Quesa
Java 3D
JSR 184 (M3G)
NVidia Scene Graph OpenSceneGraph
OpenSG
OGRE
Irrlicht
Hoops3D Photo-realistic image quality is often the desired outcome, and to this end several different, and often specialized, rendering methods have been developed. These range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 10. Driven by the game studios, hardware manufacturers such as ATI, Nvidia, Creative Labs, and Ageia have developed graphics accelerators which greatly increase the 3D rendering capability. It can be anticipated that in the future, one or more graphics rendering chips, such as the Ageia Physx chip, or the GeForce GPU's will enable full rendering at the device 10.

While full 3D photorealistic rendering is difficult with the device 10 described herein standing alone, advances in processing and rendering capability will enable greater use of 3D graphics in the future. In the golf application, a golfer object and a course object (e.g., Doral or Augusta National) can be rendered in advance and stored, making realistic 3D graphics possible. However, a preferred form is to use a cloud-based gaming provider, such as OTOY, OnLive, or Gaikai at server 44 networked to devices 10. See, U.S. patent application Ser. No. 12/146,907 (incorporated by reference).

V. Operation and Use

A primary function of AR messages is to convey the information to the golfer as illustrated in FIGS. 2-5. Preferably, a golfer can switch between a plan view and the perspective view described herein. A good example of such information is distances to a feature, such as a hazard or green or pin placement. In the illustrated embodiment, the AR golf application 106 on smart phone 10 is launched and the course information (points of interest) and other information is downloaded, if not already stored in memory. In one form, the information can be downloaded remotely over the internet. In another form, the information can be downloaded over a cell network. In another form, the course information can be downloaded in proximity to the course using, e.g., WiFi, Bluetooth, or Near Field Communication (NFC). The course information can be downloaded one time for later re-use, or can be downloaded over the network of FIG. 6 before or as the round is being played.

In any event, the GPS of smart phone 10 provides accurate position of the golfer 80 when accompanying the golfer (FIG. 2). The distance to the pin or cup on the green 82 can be displayed using the AR message 94 of FIG. 3. Of course any arbitrary location on the green can be used to approximate the position of the cup, such as center of green, front or back of the green, or a grid sector of the green. The GPS location 81 of the golfer 80 is compared with the stored location of the target, e.g. pin placement or green center and the difference is computed and displayed as at 98. The golfer 80 positions the smart phone 10 so that the camera 141 is pointed in the direction of the target—e.g. the green 82 in FIGS. 2 and 3. The camera 141 captures the background environment and AR messages 92, 94 displayed when in the camera field of view. The compass in smart phone 10 senses when the camera 141 is directed toward the point of interest and the phone is in an upright orientation (e.g. using the gyroscope). The difference computation is displayed as a yardage to the golfer as AR messages 92, 94, 98 as shown at FIGS. 3-4. For AR message 96, the current location 80 is used to look up information from a database in memory and an appropriate pro tip is displayed as at 96.

FIGS. 4 and 5 illustrate different club recommendations based on different golfers. In a preferred example, a golfer loads his personal profile into device 10, and thereafter a club is recommended after the golfer pushes a dedicated button 134-136. The profile might specify what clubs and ball the golfer is using and his shot distribution for each club. I.e. from range practice the golfer knows he hits his 7 Iron between 145 and 165 yards with a 20 yard diameter 50% of the time (155 yard with a 20 yard CEP). I.e. 50% of his 7 iron shots fall within the target area 120 illustrated in FIG. 4. Other parameters can be used as an alternative to CEP (Circular Error Probable or 50%), such as RMS (Root Mean Square, 63-38%) or 2RMS (95-98%), which modify the size (probability) of the circle and shape of the target message 120. Alternatively, different shapes can be used to more accurately reflect the personal profile if, for example, the along track error is out of proportion to the cross track error, i.e. the shape of the target 120, 124 can be non-circular such as a rectangle or ellipse. The distance, "155" yards can be displayed within the target 120 if desired.

Different methods have been devised for recommending how to play a golf hole, but the idea is the object of the game of golf—minimize the score for the hole. In a simple example, consider FIG. 4. For the below average golfer of FIG. 4, the method hereof would compute the likely score of using a 3 iron from golfer location 81 as 4.78 under Option A below, while the likely score using the 7 iron of Option B is 4.34. Therefore, the method hereof recommends option B. This is partly explained because the golfer's shot distribution for a 3 Iron from location 81 leads to an end result in the fairway only 50% of the time, while the golfer will end up in the rough 20% of the time and the lake 85 30% of the time. (For simplification, this example shows the golfer's personal profile as a 60 yard lob wedge and 90 yard sand wedge of about equal CEP, putting success close to equal.)

| Option A | | |
|---|---|---|
| 190 yds-30 yd CEP | Consequence | |
| 3 Iron | | |
| Fairway | 50% | 1 | .5 |
| Hazard | 30% | 2 | .6 |
| Rough | 20% | 1.4 | .28 |
| | | | 1.38 |
| 60 yard Lob Wedge | | |
| Fairway | 70% | 1 | .7 |
| trap | 10% | 1.2 | .12 |
| Rough | 20% | 1.4 | .28 |
| | | | 1.1 |

Total = 2.48 plus 2.3 putts

| Option B | | | |
|---|---|---|---|
| | 155 yds-<br>20 Yd CEP | Consequence | |
| 7 Iron layup | | | |
| Fairway | 100% | 1 | 1 |
| Hazard | 0% | 2 | |
| Rough | 0% | 1.4 | |
| | | | 1 |
| Full Sand Wedge | | | |
| Fairway | 80% | 1 | .8 |
| trap | 10% | 1.2 | .12 |
| Rough | 10% | 1.4 | .12 |
| | | | 1.04 |

Total = 2.04 plus 2.3 putts

Note that if the golfer of FIG. 4 had the ability (shot distribution) of the golfer of FIG. 5 then the method hereof would recommend a 3 Iron. The golfer of FIG. 5 has a 3 Iron profile of 205 yards with a 30 yard CEP. Several different methods for club recommendations have been developed. See, U.S. Patent Application Publication Nos. 20030149496; 20050227791; 20070129178 (incorporated by reference). The selection of algorithm and probability distribution is a matter of design choice.

Other profiles can be used. For example, the course may have profile data for "beginner," "average," or "good" handicap golfers without regard to equipment. Advantageously, whatever profile is used can be adjusted based on factors, such as wind speed and direction, elevation difference between the target and the golfer location, density altitude, and any equipment differences. Equipment in play might call for slight adjustments based on the type of ball and type of club. Use of network 40 of FIG. 6 is particularly useful for recommending clubs based on environmental factors. That is, an environmental correction can be transmitted to golfers 48 or club selections can be computed and transmitted to individual golfers 41.

As illustrated in FIG. 7, advertising or product placements can be inserted as an AR message if desired. For example, FIG. 7 illustrates a replay mode where golfer 80 includes an ad message 86 on his shirt back. Additionally, ad message 88 is inserted on the bag 84. Alternatives are possible for the placement of the ads, so the message 86 is geo-referenced to the position of the player 80 using GPS and object recognition. That is, the player 80 has a GPS unit 10 on his body and the ad message 86 is inserted into an AR layer proximate the GPS position using object recognition for final registration with the player's shirt. Bag 84 is identified using object recognition and message 88 is placed on bag 84.

FIG. 7 also illustrates a product insert into the AR layer. In FIG. 7, car 92 is inserted into the display in the AR layer. On car object 92, ad message 94 is inserted. AR messages 92, 94 can be displayed near the green 82 of FIGS. 3, 4, 5. Such product placement or other AR message can occur at convenient geo-referenced locations on the golf course. Ad messages 86, 88, and 94 as well as product placement 92, can be inserted into the perspective views such as FIGS. 3, 4 and 5 where any digital image is used as the background. See, U.S. patent application Ser. No. 13/152,476 (incorporated by reference).

While a preferred embodiment has been described as using a digital photographic image captured by backside camera 141, other digital images can be used as a background, such as a virtual rendered background or the actual image seen through glasses 220 or stored video or panorama. Particularly, for courses where an artificial reality environment is available, a virtual background may be preferable as it may facilitate replay and sharing of round recreations. In this alternative form, the background environment is preferably an artificial reality 3D model of the golf course as described above. The golfer is represented by an avatar traversing the golf course. Thus, spectators viewing the golf course can track the progress of the golfer along the course from any number of spectator selected viewpoints, including the viewpoint of the golfer, as well as select video feeds from camera 140 or 141.

There are a number of contests that are conducive to use of the method and system of the present invention. These popular games have heretofore been limited largely to members of a golfer's playing group. Using the system and methods hereof, the "group" can be expanded to other participants separated by time and membership. For example, select information can be shared or published with groups as more fully described in U.S. Patent Application Publication No. 2008/0036653.

A simple "corporate outing" might include contests for members of a corporate group based on: a) closest to the pin on a selected par 3; b) longest drive in the fairway on a selected hole; c) low total; or d) low handicap total; etc. Using the system and methods hereof, "outings" are facilitated. For example "outing" can be composed of ad hoc groups formed by any golfer that wants to participate with a tee time between 10-12. Further, the group might comprise any member of a golfer's social network group, such as a church group, e.g., that plays on Thursday-Saturday in June.

The system and methods hereof allow for enhanced visualization of contests, easier logistics, and real time information. For example, a golfer might choose to participate in an "outing" when downloading the course information or "checking-in" with the course. Upon arrival at the contest for "closest to the pin" display 102 will show the golfer on the tee an AR message of the current leader of this contest, as well as the leader's distance from the cup or target.

In another example, a target such as area 120 of FIG. 4 can be displayed to all members participating in an "outing" and the contest is to come closest to the center of the target or bulls-eye. Golfers 41 participating in the outing "mark" their resulting shot ending location (using a button 134-138) and the results are transmitted through network 40 to the golfers in the participating group. Additional AR messages can be selectively published to golfers participating in the outing, such as geo-referenced tags ("Joe hit OB here") to general AR messages ("Joe won target on hole 5 at 8 yards") to advertising messages ("Deal of Day for Hole 7—lunch at Maudies today—two people—$12, BUY NOW").

In addition to golfers betting on "outing" results, common golf betting games are expanded and enhanced using the system and methods hereof.

1. Nassau

The Nassau is three bets in one: low score on the front nine, low score on the back nine and low score over the full 18. The $2 Nassau is perhaps the most common bet among golf groups.

2. Round Robin

Round Robin, also known as Hollywood or Sixes, is a betting game for groups of e.g. four that involves two members of the foursome teaming up against the other two. The catch is that partners rotate every six holes. Using the system and methods hereof, Round Robin can be used by groups of various composition separated by time.

3. Sandies

Sandies have a set value throughout the round. A golfer automatically wins the bet (depending on the rules being played) either by making par on a hole in which he was in a sand trap; or by getting up-and-down from a greenside bunker.

4. Bingo Bango Bongo

Bingo Bango Bongo awards points throughout the round for three different accomplishments. At the end of the round, points are totaled and the differences are paid out.

5. Barkies

Barkies, sometimes called Woodies or Seves (as in Seve Ballesteros), are paid automatically to any player who makes par on a hole on which he hit a tree. The value of a Barkie is determined before the round.

6. Wolf

Wolf is one of the classic golf betting games designed for groups of four, but using the system and methods hereof, can be used by groups of various composition separated by time. Players rotate as the "Wolf." On each hole, the player designated as the Wolf has to choose whether to play 1 against 3, or 2 on 2; and if 2 on 2, then the Wolf has to choose a partner. The Wolf can win or lose more money by going it alone.

7. Arnies

Arnies are side bets whose value should be determined prior to the round. They are won automatically by any golfer who makes a par without having managed to get his ball into the fairway. Named in honor of Arnold Palmer, who made quite a few "Arnies" in his time.

8. Aces and Dueces

Aces and Dueces, or Acey Ducey, is a bet in which there is a winner, two modest losers, and one big loser on each hole. It's a game designed for groups of four, obviously, but using the system and methods hereof, can be used by groups of various composition separated by time. The low scorer on each hole wins a certain amount from each of the other three players; while the high scorer on each holes owes each of the other three.

9. Gruesomes

Gruesomes is betting game that pits 2-person teams against each other. Both team members tee off, then the other teams gets to choose which of the drives your side has to play. Obviously, they'll choose the worst—or most gruesome—of the two drives.

10. Criers and Whiners

Criers and Whiners is known by many different names, but the gist is the same: it's a game of mulligans for those players who are always crying and whining about that handful of shots they screwed up. "If only I could have hit that one again . . . ." The number of do-overs golfers get in Criers and Whiners is based on their handicap index.

What is claimed:

1. A method of viewing a golf event in real time during play, comprising:
   determining the position of the golfer on a golf course during play using a portable device including glasses wearable by the golfer and a GPS receiver;
   comparing the position of a feature on said golf course with said golfer position;
   determining a distance between said feature position and said golfer position;
   operating said portable device to view said feature in a perspective view from said golfer position;
   viewing in real time during play an augmented reality ("AR") message concerning said distance at said golf course in said perspective view on the portable device from said golfer position on said golf course, wherein said perspective view is not an overhead view of said golf event.

2. The method of claim 1, wherein said AR message is overlaid at least a portion of a photo image of the golf course as a background environment.

3. The method of claim 1, wherein said AR message is overlaid at least a portion of the golf course as a background environment.

4. The method of claim 1, wherein said AR message is transmitted to spectators.

5. The method of claim 1, wherein changing the view of said AR message comprises changing the view point to the location of a feature.

6. A portable device for assisting a golfer during the play of a golf hole comprising:
   a GPS receiver for determining the position of the device on said golf hole;
   a memory storing the location of one or more features of said golf hole;
   a processor operable for comparing said device position with the location of a feature to determine a distance;
   a display operable to view a perspective view of said golf hole during play from said device position on said golf hole to said feature, said display operable to show an augmented reality ("AR") message including said distance visible on said display of said perspective view; and
   wherein said portable device comprises glasses that include a transparent display operable to view at least a portion of said golf hole and to view said augmented reality message.

7. The portable device of claim 6, wherein said augmented reality message includes an indicator of the location of the feature in said golfer's perspective view of said golf hole.

8. The portable device of claim 6, wherein said feature is a location on a green of the golf hole being played.

9. The portable device of claim 6, wherein said golf hole is an image.

10. The portable device of claim 9, wherein said image is a photo digital image and said device includes a camera for capturing said digital image.

11. The portable device of claim 6, wherein said golf hole includes an artificial rendering.

12. The portable device of claim 6, wherein the memory includes a map of the golf hole being played, and said golfer can operate the device to display a plan view of said map on said display.

13. The portable device of claim 6, wherein said memory includes a database having feature locations and a plurality of advertisements.

14. The portable device of claim 13, wherein one of the plurality of advertisements is downloaded from the database and viewed on said display to overlay said perspective view.

15. The portable device of claim 14, wherein one of the plurality of advertisements is downloaded based in part on information related to said golfer.

16. A method of using a portable device accompanying a golfer during play of a golf hole, comprising:
   determining a position of said device on said golf hole using GPS;
   comparing said device position with a green location of said golf hole to determine a distance between said device position and green location;
   viewing on a display on the portable device, a perspective view of said golf hole from said device position on said golf hole towards said green location, wherein the portable device comprises glasses wearable by the golfer and said perspective view is not an overhead plan view; and viewing an augmented reality message on said perspective view including said distance to approximately the green location.

17. The method of claim 16, wherein the viewing step includes retrieving from a memory a photographic image of said golf hole from said position.

18. The method of claim 16, wherein the viewing step includes taking a digital image of said golf hole with a camera included with said device.

19. The method of claim 16, including comparing said position with the location of a hazard to determine a distance between said position and said hazard, and imposing an augmented reality message on said perspective view including said distance between said position and said hazard.

20. A method of displaying messages to a golfer during play of a golf hole, comprising the steps of:
providing a portable device comprising glasses adapted for wear by the golfer during play;
connecting the portable device with a server establishing communication between said device and said server;
receiving information concerning a feature of said golf hole on said device from said server;
viewing on the glasses during play of said golf hole a perspective view from a position of the device on said golf hole towards said feature on said golf hole, including viewing said feature through a transparent portion of the glasses; and
viewing an augmented reality message on said perspective view showing said information of said feature on said perspective view.

21. The method of claim 20, wherein said server includes demographics and said augmented reality message includes an advertisement deemed relevant to such demographics.

22. The method of claim 20, wherein said server includes information personal to said golfer and said augmented reality message includes an advertisement deemed relevant to said personal information.

23. The method of claim 20, wherein said augmented reality message includes an icon and the golfer can activate a purchase by selecting said icon.

24. The method of claim 20, wherein said augmented reality message includes a coupon that can be selected and stored for later use on said device.

25. The method of claim 20, including
downloading another message from said server to said device; and
displaying said other message on said perspective view.

26. The method of claim 1, including changing the view to an overhead plan view.

27. The method of claim 1, wherein a spectator performs said viewing the AR message in a perspective view step.

* * * * *